Feb. 20, 1934.    F. WINKLER    1,947,961
FREE WHEEL HUB WITH COASTER BRAKE
Filed Aug. 25, 1932

Inventor
Franz Winkler
By
Dean, Fairbank, Hirsch & Foster
Attorneys.

Patented Feb. 20, 1934

1,947,961

UNITED STATES PATENT OFFICE

1,947,961

FREE WHEEL HUB WITH COASTER BRAKE

Franz Winkler, Schweinfurt, Germany

Application August 25, 1932, Serial No. 630,365, and in Germany August 25, 1931

4 Claims. (Cl. 192—6)

The invention relates to a free wheel hub with back pedalling brake comprising a driving bevel coupling of which one member is provided on the circumference of a power transmitting sleeve screwable on the driver of the hub and the other member on a flange or contraction projecting inwards from the hub sleeve.

The object of the invention is to provide means for securing the sure and uniform grip of the conical coupling faces when the clutch is thrown in. This object is attained through longitudinal grooves formed in the said internal flange of the hub shell so that the conical face is interrupted at several places and the shell rendered more elastic which will allow a better adaptation of the clutch faces with each other.

A further object of the invention is to extend the grooves throughout the entire hub shell, i. e., in the cylindrical inner face thereof, thus increasing its elasticity and presenting recesses for the engagement of lugs projecting from the outer edges of discs of a plate brake placed in the hub shell and adapted to be operated by the same power transmitting sleeve which bears the inner clutch member.

An embodiment of the invention is illustrated by way of example in the annexed drawing, which forms a part of this specification and in which—

Figure 1:
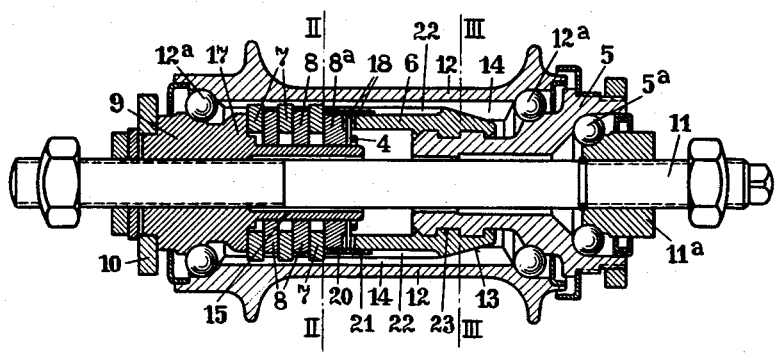
Figure 2:
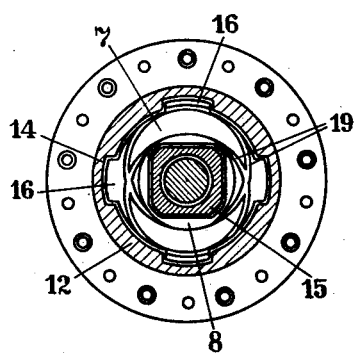
Figure 3:
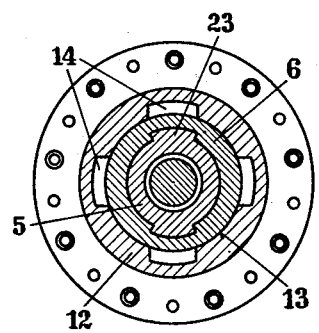

Fig. 1 is a longitudinal sectional elevation showing the whole free wheel hub with coaster brake, Fig. 2 is a cross section on the line II—II of Fig. 1, and Fig. 3 is a cross section on the line III—III of Fig. 1.

Like numerals denote like parts throughout all figures of the drawing.

In its essential parts the free wheel hub with back pedalling brake comprises a driver or driving member 5 having screw threads 23 in its peripheral surface, a clutch member or coupling sleeve 6 engaged in said threads with female screw threads, a plate brake with outside plates 7 and inside plates 8, a brake supporting member 9 which by a brake arm 10 can be connected with the cycle frame so as to be prevented from rotating, and a coupling and power transmitting appliance located between the coupling sleeve and the brake. These parts are arranged in the hub shell 12 and mounted on the wheel axle 11 and are held together by the latter. The hub sleeve 12 is mounted by means of ball bearings 12a on the driver 5, on the one hand, and on the member 9, on the other hand, while the driver is supported by a ball bearing 5a on a cone 11a screwed on the axle 11. The coupling imparting the driving movement to the hub sleeve 12 comprises outer and inner conical surfaces 13 with which are provided the circumference of the coupling sleeve 6 and the opposite portion of the internal surface of the hub 12, respectively. For this purpose, the hub sleeve is provided with an annular thickened portion projecting inwards of the hub sleeve and having the hollow conical coupling surface. The said thickened portion is axially cut by several, e. g. four longitudinal grooves 14 which descend to the wall of the hub sleeve and which form ribs extending radially inwardly.

These grooves are extended from end to end through the shell 12 and serve in their continuation as connecting means for part of the coaster brake. The brake is as aforesaid composed of two sets of discs or circular plates 7 and 8 mounted upon a projection 15 of the bearing member 9. The inner plates 8 having a polygonal, e. g. square hole in the center are placed on the correspondingly square projection 15 so as to be prevented from turning on the same. In the circumference of the outside plates 7 there are formed projections 16 engaging with the grooves 14 and connecting the plates to the hub sleeve 12 in such a way that they are prevented from relatively turning but allowed to shift therein. The plates 7 are for instance made of brass and the plates 8 the same as the bearing member 9 of steel. The shoulder of the member 9 against which bears the set of plates is enlarged and the flange 17 thus formed also operates as a friction surface of the brake. Near the free end of the projection 15 is provided an end plate 8a and secured thereon by means of a spring ring 4. On the outer flat side of the said plate 8a and on the opposite end face of the coupling sleeve 6 a tooth coupling 18 is provided which ensures the non-revoluble connection of the coupling sleeve 6 with the brake when this sleeve is screwed towards the brake.

Some of the brake plates, preferably the brass plates 7, have eccentric oil grooves 19 on their flat sides which grooves may be obtained by stamping.

A friction spring devised for controlling the movement of the sleeve 6 consists of a split ring 20 which slides on the circumference of the plate 8a and engages by lateral projections or tongues 21 with longitudinal grooves 22 of the coupling sleeve 6.

The free wheel hub with coaster brake operates as follows. In the case of driving, the conical clutch 13 will be engaged by the rotation of the driver, thereby shifting the sleeve 6 to the right through the mediation of the screw threads 23. In the case of free wheeling the overrunning hub disengages the drive clutch by screwing the coupling sleeve towards the brake. In the case of braking the driver 5 being turned backwards by back pedalling further screws the coupling sleeve 6 towards the brake until the clutch 18 has been engaged and tightened, the brake plates 7 and 8 being firmly pressed against one another.

The particular construction of the free wheel brake hub above described presents the advantage of great simplicity and safety. When the conical surface of the coupling sleeve 6 is pressed against the hollow conical surface of the hub sleeve 12, the coupling surfaces are caused to firmly bear against each other as the cut-out portions 14 of the hollow cone permit an accommodation and accurate fit of the said surfaces, owing to a slight elasticity of the hub shell at the recessed places. Further, the lubricating grease or oil can readily be removed from the coupling surfaces and pressed into the grooves so that slip of the clutch will be avoided. The through-grooves at the same time serve for receiving the projections 16 of the plates 7.

What I claim is—

1. In a free wheel hub with coaster brake, the combination with an axle, of a hub shell having an inner conical projection and a plurality of longitudinal grooves through the said projection and the inner surface of the hub shell, a driver, a conical coupling member axially movable on said driver and adapted to be engaged with the conical projection, and a disc brake of which the outer discs engage in the said grooves.

2. In a free wheel hub with coaster brake, a driving member, a freely rotatable annular hub shell, a uni-directional clutch mechanism for transmitting power between said driving member and said hub shell, and including circumferentially spaced ribs extending radially inwardly substantially along the entire length of said hub shell, said ribs presenting radially inwardly facing conical clutch surfaces near one end thereof, a clutch member mounted in the interior of said hub shell, and presenting a radially outwardly facing conical surface conforming with said radially inwardly facing conical surfaces to permit clutch engagement between said clutch member and said shell, means for moving said clutch member axially in either direction upon predetermined relative rotation of said hub shell and said clutch member, and a multiple disk brake in the interior of said hub shell, alternate disks of said brake having portions of the outer peripheries thereof engaging said shell between said ribs, said clutch member when moved in one direction serving to apply the brake to prevent further rotation of said hub shell.

3. In a free wheel hub with coaster brake, an annular member having a small number of circumferentially spaced, inwardly extending ribs collectively presenting an interrupted conical clutch surface, a second member mounted within said annular member, and presenting a conical surface, and means for moving said last mentioned member axially into and out of clutch engagement with the other member, the circumferential spaces between said ribs being sufficiently wide and the wall of the annular member between said ribs being sufficiently thin to give said annular member elasticity and to effect firm gripping of the two members when in clutch engagement.

4. In a free wheel hub, a hub shell having a small number of circumferentially spaced ribs extending radially inwardly, and substantially parallel to the axis of said member, said ribs presenting radially inwardly facing conical clutch surfaces, a coupling member mounted coaxially with respect to said annular member, and presenting a radially outwardly facing conical surface conforming with said radially inwardly facing surfaces to permit clutch engagement between said hub shell and coupling member, and means for moving said coupling member axially into and out of clutch engagement with the hub shell, the circumferential space between said ribs being sufficiently wide and the wall of the hub shell between said ribs being sufficiently thin so that when the said hub shell and coupling member are in firm clutch engagement greater grippage is effected by elasticity.

FRANZ WINKLER.